US005640942A

United States Patent [19]

Hollister

[11] Patent Number: 5,640,942

[45] Date of Patent: Jun. 24, 1997

[54] ULTRAVIOLET CURED THROTTLE BORE PRE-COATING

[75] Inventor: David Bryce Hollister, Essex, England

[73] Assignee: Ford Motor Company, Dearnorn, Mich.

[21] Appl. No.: 586,352

[22] Filed: Jan. 16, 1996

[51] Int. Cl.$^6$ .................................. C08J 7/04; F16K 1/226

[52] U.S. Cl. .............................. 123/337; 251/306; 427/510

[58] Field of Search .............................. 123/337; 251/306; 427/510, 521, 541, 558

[56] References Cited

U.S. PATENT DOCUMENTS 2,899,943 8/1959 Haensel et al. .......................... 123/1 A 5,019,417 5/1991 Northcutt ................................ 427/521

FOREIGN PATENT DOCUMENTS 2131918 6/1984 United Kingdom .................... 251/306

*Primary Examiner*—Andrew M. Dolinar

*Attorney, Agent, or Firm*—Donald A. Wilkinson

[57] ABSTRACT

A throttle body assembly (10) including a throttle plate (22) mounted in the main bore (16) of the throttle body. Either the throttle plate, the bore or both are pre-sludged around the throttle plate/bore interface, using a sealant (24) that is cured with Ultraviolet energy, in order to maintain better air flow control over the life of the throttle body.

4 Claims, 1 Drawing Sheet

ULTRAVIOLET CURED THROTTLE BORE PRE-COATING

FIELD OF THE INVENTION

The present invention relates to throttle bodies used for air intake control in internal combustion engines and more particularly to coatings applied to the interiors of throttle bodies to pre-condition them.

BACKGROUND OF THE INVENTION

During the manufacture of electronic fuel injection throttle bodies, a precise interface is formed between the throttle plate and the main bore of the throttle housing. This interface is subject to variances imposed by small burrs and small dimensional tolerances. Prior to assembly into a vehicle, throttle body assemblies are set to a precise idle airflow to negate the effects of the plate/bore variance. As vehicles age, hydrocarbon deposits (sludge) form at the throttle plate/bore interface, causing a downward shift in the idle air flow. Current powertrain control systems (on-board computers) can correct for some shift in idle airflow, but excessive shift causes engine idle instability. To minimize the idle airflow shift, most manufacturers of throttle bodies pre-sludge (pre-condition) the throttle plate/bore interface, thereby minimizing the airflow effect of the naturally occurring hydrocarbon deposits (sludge). They do this by applying a sealant to the throttle plate or main bore during manufacture of the throttle body to simulate the effects of sludge build up.

The sealants currently in use for the pre-conditioning process use volatile organic solvents or water as their carrier mechanism. The sealer is applied and the solvent or water is then evaporated away to leave a durable sealant at the throttle plate/bore interface. In the case of sealants having volatile organic solvents, the evaporated solvent must be ventilated during application and curing, and precautions must be taken to prevent fire. In the case of water based sealants, the curing process can become very slow and is sensitive to temperature and humidity conditions, which must be accounted for to have a proper cure. The time for curing can be as much as eighteen minutes. This creates cost concerns associated with work in process inventory for the long cure time.

Thus, it is desirable to pre-sludge a throttle plate/bore interface with sealant having relatively fast cure times, substantially reduced ventilation requirements as compared to organic based solvents, and minimal concerns with changes in temperature and humidity on the curing process as compared to water based sealants.

SUMMARY OF THE INVENTION

In its embodiments, the present invention contemplates an engine with a throttle body. The throttle body includes a housing including a wall defining a main bore therethrough and a throttle plate, rotatably mounted in the main bore between open positions and a closed position, forming an interface between the wall and the throttle plate. The throttle body also includes an ultraviolet cured sealant on one of the throttle plate and the main bore wall at the interface between the two, whereby the sealant will form a pre-sludging coating at the interface.

The present invention further contemplates a method of pre-sludging an interior portion of a throttle body having a housing with a wall defining a main bore and a throttle plate rotatably mounted in the bore positionable to form an interface between the two. The method comprises the steps of: applying an ultraviolet curable sealant to one of the throttle plate and the main bore wall in the proximity of the interface; and directing ultraviolet radiant energy onto the sealant for a predetermined time, thereby curing the sealant.

Accordingly, an object of the present invention is to pre-sludge (pre-condition) a throttle body at the throttle plate/main bore interface by employing an ultraviolet curing sealant (or adhesive).

An advantage of the present invention is that the pre-sludging is accomplished while avoiding the use of solvent based sealants that require extensive ventilation while curing, and avoiding the temperature/humidity sensitivity considerations associated with water based sealants.

An additional advantage of the present invention is that the ultraviolet curing process is relatively fast, reducing the inventory associated with work in process.

DETAILED DESCRIPTION OF THE PREFERRED EMBODIMENTS

Figure 1:
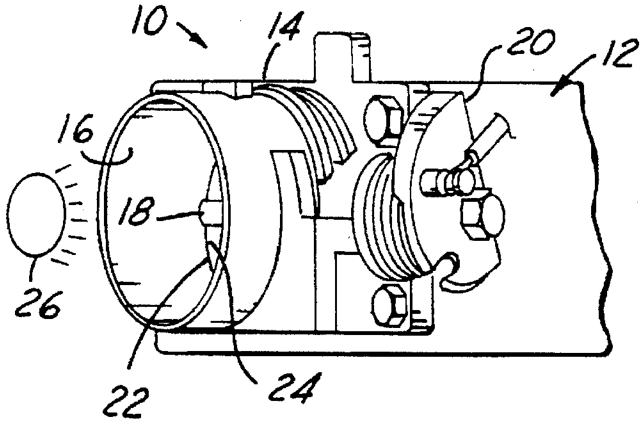
FIG. 1 is a perspective view of a throttle body and schematic of an ultraviolet source in accordance with the present invention.

A typical throttle body assembly 10 is mounted in an air intake system of an engine 12. The throttle body assembly 10 includes a housing 14 having a main bore 16 therethrough. Extending through the main bore 16 is a throttle shaft 18, which is connected to a valve actuation mechanism 20 at one end. Mounted to the throttle shaft 18 within the main bore 16 is a throttle plate 22. As the valve actuation mechanism 20 rotates, it rotates the throttle shaft 18, which in turn rotates the throttle plate 22 relative to the main bore 16 between a closed and various open positions.

When the throttle plate 22 is in a fully closed position, the edge of the throttle plate 22 is in surface contact around its periphery with the inner wall of the main bore 16. This throttle valve/bore interface between the main bore 16 and the throttle plate 22 is where sludge build-up can interfere with the proper air flow. To account for this, ultraviolet sealant 24 is adhered to the throttle plate 22 during manufacture. It is adhered on the upstream (top) face of the throttle plate 22 around its periphery to assure that the pre-sludging will be at the throttle valve/bore interface. As an alternative, the sealant can be adhered on the downstream face around its periphery.

The ultraviolet sealant 24 is applied to the throttle plate 22 after assembly of the throttle body 10. A conventional ultraviolet radiant energy source 26 is then directed down the main bore 16 on the upstream side of the throttle plate 22 to cure the sealant 24. The throttle body is now ready to calibrate. The time that this radiant energy needs to be applied is in the tens of seconds, as little as fifteen seconds may do for some ultraviolet sealants. This is in comparison to the current types of sealants that are used where the curing time can be as much as eighteen minutes. Any formulation of ultraviolet sealant will do that has adequate wear characteristics, that balances between bond strength and shear strength, and that avoids too much swelling when exposed to moisture; basically the same characteristics the current solvent and water based sealants have once they are cured.

Figure 3:
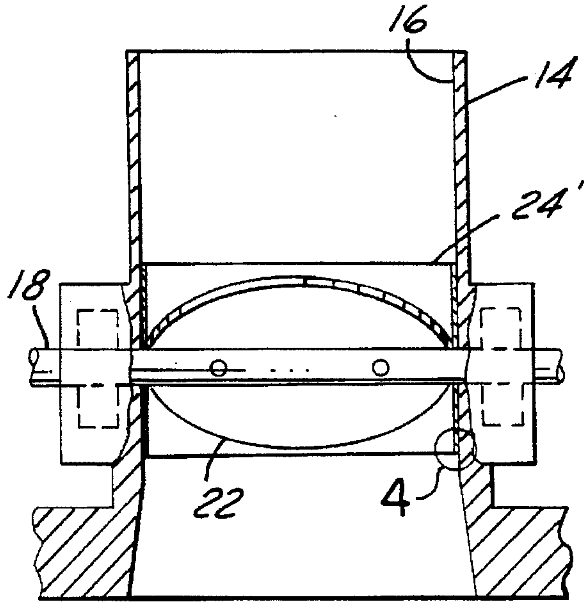
FIG. 3 is a partial sectional view of a throttle body illustrating an alternate embodiment of the present invention.
Figure 4:
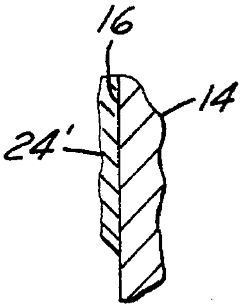
FIG. 4 is a view on an enlarged scale of encircled area 4 in FIG. 3.

An alternate embodiment is shown in FIGS. 3 and 4. Here the ultraviolet sealant 24' is applied to the interior wall of the main bore 16 instead of the surface of the throttle plate 22. It is applied around the periphery of the wall extending past the throttle plate/bore interface both upstream and downstream a short distance. With the throttle plate 22 held in the open position, the sealant 24' is cured using the ultraviolet source.

Figure 2:
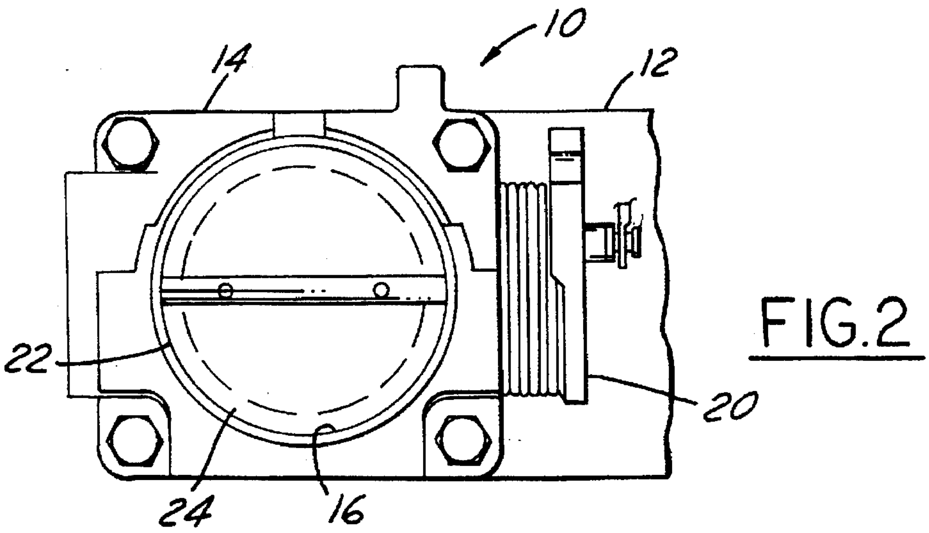
FIG. 2 is a side view of a throttle body in accordance with the present invention.

As a further alternate embodiment, the ultraviolet sealant can be located on both the throttle plate as shown in FIGS. 1 and 2 and also the wall of the main bore as shown in FIGS. 3 and 4 to assure a full pre-sludging effect.

While certain embodiments of the present invention have been described in detail, those familiar with the art to which this invention relates will recognize various alternative designs and embodiments for practicing the invention as defined by the following claims.

I claim:

1. A method of pre-sludging an interior portion of a throttle body having a housing with a wall defining a main bore and a throttle plate rotatably mounted in the bore positionable to form an interface between the two, the method comprising the steps of:

applying an ultraviolet curable sealant to one of the throttle plate and the main bore wall in the proximity of the interface; and directing ultraviolet radiant energy onto the sealant for a predetermined time, thereby curing the sealant.

2. The method of claim 1 wherein the step of applying the sealant comprises applying the sealant to the throttle plate around its periphery.

3. The method of claim 2 further including the step of applying the ultraviolet curable sealant to the main bore wall at the interface.

4. The method of claim 1 wherein the step of applying the sealant comprises applying the sealant to the main bore wall in the proximity of the interface.

* * * * *